United States Patent
Lin

(10) Patent No.: US 8,251,090 B2
(45) Date of Patent: Aug. 28, 2012

(54) FAUCET HAVING A PRESSURE RELEASE FUNCTION

(75) Inventor: Mei-Fen Lin, Changhua (TW)

(73) Assignee: Ing Tzon Co., Ltd., Changhua, Changhua Hsien (TW)

( * ) Notice: Subject to any disclaimer, the term of this patent is extended or adjusted under 35 U.S.C. 154(b) by 813 days.

(21) Appl. No.: 12/419,479

(22) Filed: Apr. 7, 2009

(65) Prior Publication Data

US 2010/0252133 A1   Oct. 7, 2010

(51) Int. Cl.
*F16K 15/00* (2006.01)

(52) U.S. Cl. ............. 137/467; 137/118.03; 137/118.07; 137/119.04; 137/119.05; 137/119.08; 137/599.18

(58) Field of Classification Search ............ 137/118.01, 137/118.03, 118.06, 118.07, 119.01, 119.03, 137/119.04, 119.05, 119.08, 467, 599.18, 137/625.48, 862; 251/231

See application file for complete search history.

(56) References Cited

U.S. PATENT DOCUMENTS

| | | | | |
|---|---|---|---|---|
| 3,473,558 A * | 10/1969 | Mongerson | .................. | 137/467 |
| 3,656,503 A * | 4/1972 | Ward | ............................. | 137/359 |
| 3,746,031 A * | 7/1973 | Christiansen | ..................... | 4/678 |
| RE27,819 E * | 11/1973 | Moen | ................ | 4/668 |
| 3,895,643 A * | 7/1975 | Ward | ...................... | 137/119.04 |
| 3,913,605 A * | 10/1975 | Ward | ............................. | 137/467 |
| 4,116,210 A * | 9/1978 | Nelson | ......................... | 137/467 |
| 5,279,005 A * | 1/1994 | Valley | ............................. | 4/567 |

* cited by examiner

*Primary Examiner* — Craig Schneider
*Assistant Examiner* — Jessica Cahill
(74) *Attorney, Agent, or Firm* — Alan Kamrath; Kamrath IP Lawfirm, PA

(57) ABSTRACT

A faucet includes a faucet body, a control knob, a follower and a switching valve. The faucet body has a water inlet, a water outlet and a switching port. The switching valve includes a driven rod moved with the control knob, a sealing plate having a plurality of connecting holes, a pressure release plate detachably pressing the sealing plate, and an elastic member mounted between the sealing plate and the pressure release plate. Thus, the switching valve can release the water pressure in the faucet body automatically so that the sealing plate is moved downward by its gravity to detach from the switching port, and the water inlet, the switching port and the water outlet are connected at a normal state to allow passage of water to prevent the water from being introduced into the shower head at the next usage.

15 Claims, 7 Drawing Sheets

FAUCET HAVING A PRESSURE RELEASE FUNCTION

BACKGROUND OF THE INVENTION

1. Field of the Invention

The present invention relates to a faucet and, more particularly, to a faucet that can control water to flow outwardly from a spout or shower head.

2. Description of the Related Art

A conventional faucet in accordance with the prior art shown in FIG. 7 comprises a faucet body 50, a control knob 64, a follower 63 a switching valve 60, and an end cap 70. The faucet body 50 has a first portion provided with a water inlet 53, a second portion provided with a water outlet 52 and a mediate portion provided with a switching port 51 connected between the water inlet 53 and the water outlet 52. The water outlet 52 of the faucet body 50 has a distal end provided with a spout 120. The control knob 64 is movably mounted on the faucet body 50 and has a lower end extending into the faucet body 50. The follower 63 is movably mounted in the faucet body 50 and secured on the lower end of the control knob 64 to move in concert with the control knob 64. The switching valve 60 is mounted in the faucet body 50 and includes a driven rod 61 secured on the follower 63 to move in concert with the follower 63, and a sealing plate 62 secured on the driven rod 61 to move in concert with the driven rod 61 and movable to close and seal the switching port 51 of the faucet body 50 so as to interrupt a connection between the water inlet 53 and the water outlet 52 of the faucet body 50. The end cap 70 is secured on the faucet body 50 to close the water inlet 53 of the faucet body 50. The end cap 70 has a central portion provided with a mounting portion 72 for mounting a water supply pipe (not shown) and has a side provided with an entrance 71 connected between the water supply pipe and the water inlet 53 of the faucet body 50.

In operation, the water supply pipe is connected between the entrance 71 of the end cap 70 and a shower head (not shown). In such a manner, when the sealing plate 62 of the switching valve 60 is detached from the switching port 51 of the faucet body 50, the water inlet 53 and the water outlet 52 of the faucet body 50 are connected via the switching port 51 of the faucet body 50, so that the water from the water supply pipe in turn flows through the entrance 71 of the end cap 70, the water inlet 53, the switching port 51 and the water outlet 52 of the faucet body 50 and flows outwardly from the spout 520 of the water outlet 52.

On the contrary, when the sealing plate 62 of the switching valve 60 is moved upward (by pulling the control knob 64 upward) to close and seal the switching port 51 of the faucet body 50 as shown in FIG. 7, the connection between the water inlet 53 and the water outlet 52 of the faucet body 50 is interrupted, so that the water from the water supply pipe is stopped by the sealing plate 62 of the switching valve 60 and is forced to flow into the shower head. At this time, the water pressure in the water inlet 53 of the faucet body 50 presses the sealing plate 62 of the switching valve 60, so that the sealing plate 62 of the switching valve 60 presses the switching port 51 of the faucet body 50 closely. When the water from the water supply pipe is stopped after usage, the water pressure in the water inlet 53 of the faucet body 50 is reduced.

However, when the water pressure in the water inlet 53 of the faucet body 50 is greater than the weight of the switching valve 60, the sealing plate 62 of the switching valve 60 still presses the switching port 51 of the faucet body 50 and cannot be moved downward automatically, so that the water cannot enter the switching port 51 of the faucet body 50 and is forced into the shower head at the next usage, thereby causing disturbance to the user. In addition, the user has to push the control knob 64 downward to move the sealing plate 62 of the switching valve 60 downward so as to switch the water outlet mode of the faucet, thereby causing inconvenience to the user.

BRIEF SUMMARY OF THE INVENTION

In accordance with the present invention, there is provided a faucet, comprising: a faucet body, a control knob, a follower and a switching valve. The faucet body has a first portion provided with a water inlet, a second portion provided with a water outlet and a mediate portion provided with a switching port connected between the water inlet and the water outlet. The control knob is movably mounted on the faucet body and has a lower end extending into the faucet body. The follower is movably mounted in the faucet body and secured on the lower end of the control knob to move in concert with the control knob. The switching valve is mounted in the faucet body and includes a driven rod secured on the follower to move in concert with the follower, a sealing plate secured on the driven rod to move in concert with the driven rod and having a peripheral wall provided with a plurality of connecting holes connected between the water inlet and the switching port of the faucet body, a pressure release plate mounted on the driven rod and detachably pressing the sealing plate to interrupt a connection between the water inlet of the faucet body and the connecting holes of the sealing plate, and an elastic member mounted between the sealing plate and the pressure release plate to push the pressure release plate to detach from the sealing plate and to connect the connecting holes of the sealing plate to the water inlet of the faucet body.

The primary objective of the present invention is to provide a faucet having a pressure release function.

Another objective of the present invention is to provide a faucet, wherein the switching valve has a pressure release function to release the water pressure in the faucet body automatically so that the sealing plate of the switching valve is moved downward by its gravity to detach from the switching port of the faucet body, while the water inlet, the switching port and the water outlet of the faucet body are connected at a normal state to allow entrance and passage of the water in the water supply pipe so as to prevent the water from being introduced into the shower head at the next usage.

A further objective of the present invention is to provide a faucet, wherein the switching valve is moved downward by its gravity to open the faucet body automatically so that a user needs not to push the control knob downward to switch the water outlet mode of the faucet, thereby facilitating the user switching and operating the faucet.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
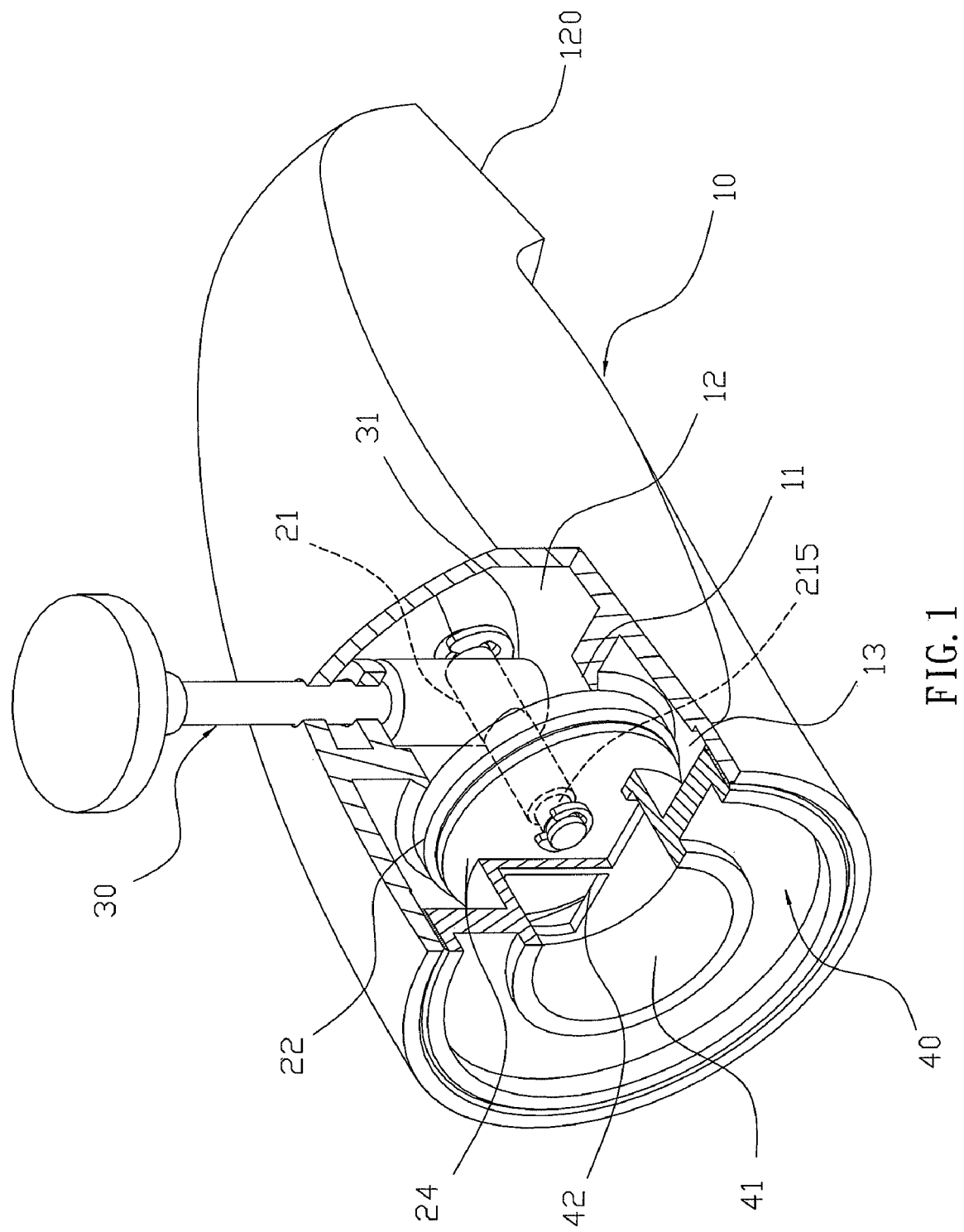
FIG. 1 is a partially perspective cross-sectional view of a faucet in accordance with the preferred embodiment of the present invention.

Referring to the drawings and initially to FIGS. 1-4, a faucet in accordance with the preferred embodiment of the present invention comprises a faucet body 10, a control knob 30, a follower 31 and a switching valve 20.

The faucet body 10 has a first portion provided with a water inlet 13, a second portion provided with a water outlet 12 and a mediate portion provided with a switching port 11 connected between the water inlet 13 and the water outlet 12. The water outlet 12 of the faucet body 10 has a distal end provided with a spout 120. The switching port 11 of the faucet body 10 has a substantially circular profile.

The control knob 30 is movably mounted on the faucet body 10 and has a lower end extending into the faucet body 10. The follower 31 is movably mounted in the faucet body 10 and secured on the lower end of the control knob 30 to move in concert with the control knob 30. The follower 31 is provided with a through hole 311.

The switching valve 20 is mounted in the faucet body 10 and includes a driven rod 21 secured on the follower 31 to move in concert with the follower 31, a sealing plate 22 secured on the driven rod 21 to move in concert with the driven rod 21 and having a peripheral wall provided with a plurality of connecting holes 223 connected between the water inlet 13 and the switching port 11 of the faucet body 10, a pressure release plate 24 mounted on the driven rod 21 and detachably pressing the sealing plate 22 to interrupt a connection between the water inlet 13 of the faucet body 10 and the connecting holes 223 of the sealing plate 22, and an elastic member 23 mounted between the sealing plate 22 and the pressure release plate 24 to push the pressure release plate 24 to detach from the sealing plate 22 and to connect the connecting holes 223 of the sealing plate 22 to the water inlet 13 of the faucet body 10.

The driven rod 21 of the switching valve 20 extends through the through hole 311 of the follower 31. The driven rod 21 of the switching valve 20 has a first end protruding outwardly from the follower 31 and provided with a first retaining groove 211 to retain a first retaining member 212 which limits the follower 31 and a second end protruding outwardly from the pressure release plate 24 and provided with a second retaining groove 213 to retain a second retaining member 214 which limits the pressure release plate 24. The driven rod 21 of the switching valve 20 has a peripheral wall provided with a threaded portion 216 and a guide portion 215 located beside the threaded portion 216. The guide portion 215 of the driven rod 21 has a diameter smaller than that of the threaded portion 216 of the driven rod 21. The guide portion 215 of the driven rod 21 is located between the threaded portion 216 and the second retaining groove 213 of the driven rod 21. The guide portion 215 and the threaded portion 216 of the driven rod 21 are located between the first retaining groove 211 and the second retaining groove 213 of the driven rod 21.

The pressure release plate 24 of the switching valve 20 is movably mounted on the guide portion 215 of the driven rod 21 and is limited between the threaded portion 216 of the driven rod 21 and the second retaining member 214. The pressure release plate 24 of the switching valve 20 has a central portion provided with a sliding hole 241 movable on the guide portion 215 of the driven rod 21. The pressure release plate 24 of the switching valve 20 closes and seals the connecting holes 223 of the sealing plate 22 when the pressure release plate 24 of the switching valve 20 compresses the elastic member 23 of the switching valve 20 and abuts the sealing plate 22 of the switching valve 20.

The sealing plate 22 of the switching valve 20 is movable to close and seal the switching port 11 of the faucet body 10 so as to interrupt a connection between the water inlet 13 and the water outlet 12 of the faucet body 10. The sealing plate 22 of the switching valve 20 has a first side 220 that is movable to close and seal the switching port 11 of the faucet body 10 and a second side 224 provided with a receiving groove 222 to receive the elastic member 23. Preferably, the receiving groove 222 of the sealing plate 22 has an annular shape and faces the pressure release plate 24. The sealing plate 22 of the switching valve 20 has a central portion provided with a screw bore 221 screwed onto the threaded portion 216 of the driven rod 21 to lock the sealing plate 22 onto the driven rod 21.

The elastic member 23 of the switching valve 20 is retained in the receiving groove 222 of the sealing plate 22 and partially protrudes outwardly from the second side 224 of the sealing plate 22 to separate the pressure release plate 24 from the sealing plate 22 at a normal state. Preferably, the elastic member 23 of the switching valve 20 has an annular shape.

The faucet further comprises an end cap 40 secured on the first portion of the faucet body 10 to close the water inlet 13 of the faucet body 10. The end cap 40 has a central portion provided with a mounting portion 41 for mounting a water supply pipe 100 (see FIG. 4) and has a side provided with an entrance 42 connected between the water supply pipe 100 and the water inlet 13 of the faucet body 10.

Figure 2:
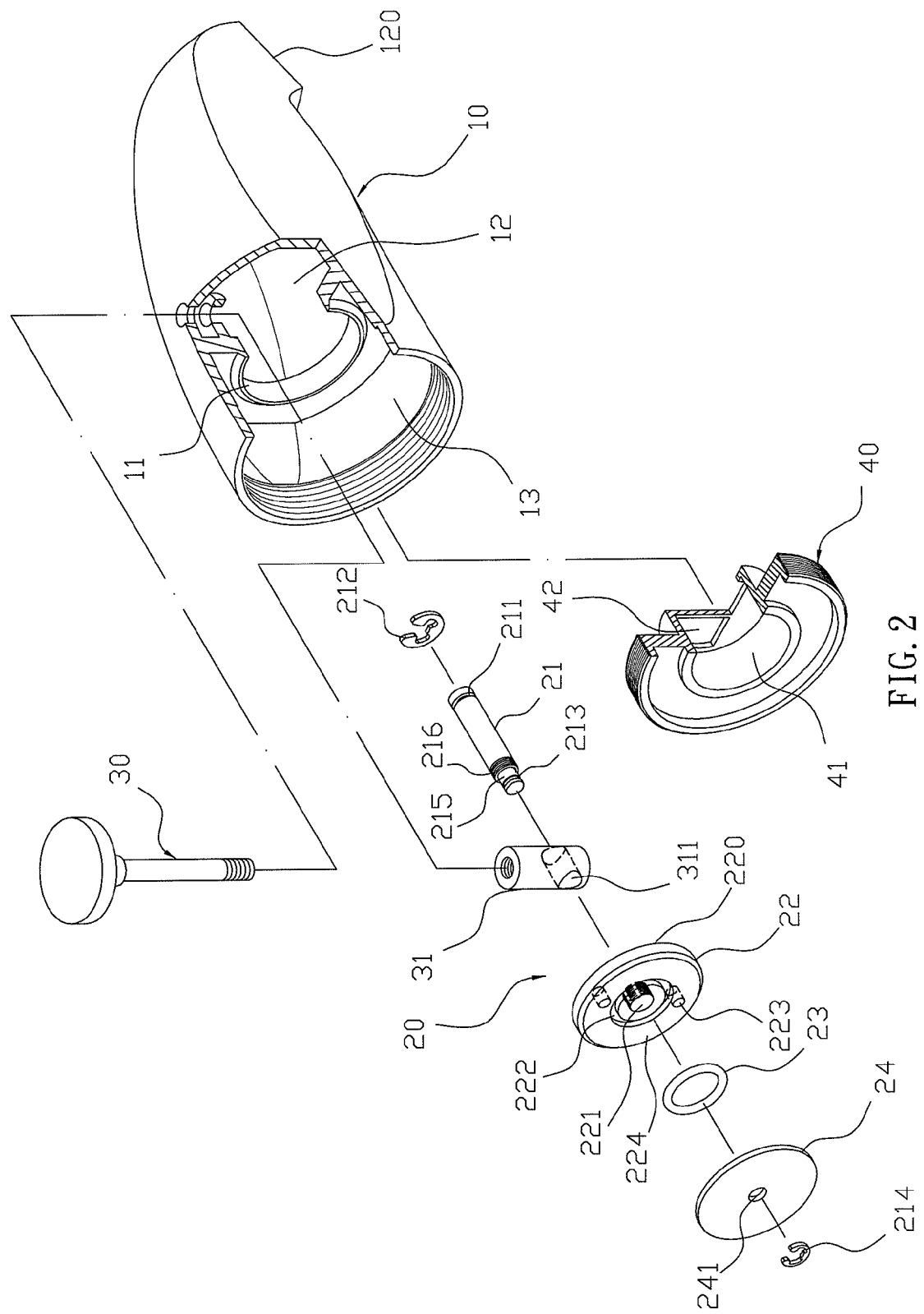
FIG. 2 is an exploded perspective view of the faucet as shown in FIG. 1.
Figure 3:
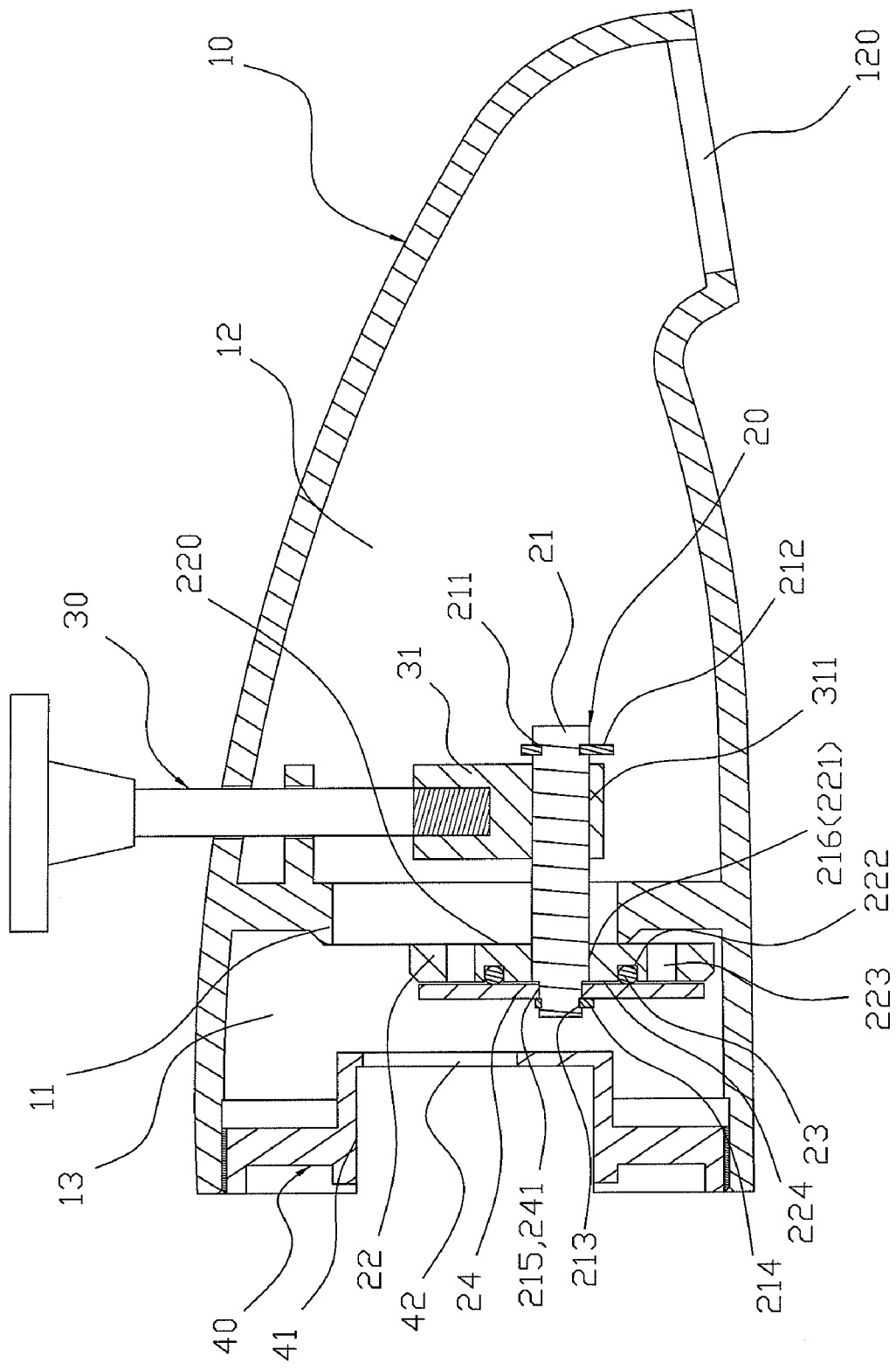
FIG. 3 is a side cross-sectional view of the faucet as shown in FIG. 1.

In operation, referring to FIGS. 3-6 with reference to FIGS. 1 and 2, the water supply pipe 100 is connected between the entrance 42 of the end cap 40 and a shower head (not shown). In such a manner, when the sealing plate 22 of the switching valve 20 is detached from the switching port 11 of the faucet body 10 as shown in FIG. 3, the water inlet 13 and the water outlet 12 of the faucet body 10 are connected via the switching port 11 of the faucet body 10, so that the water from the water supply pipe 100 in turn flows through the entrance 42 of the end cap 40, the water inlet 13, the switching port 11 and the water outlet 12 of the faucet body 10 and flows outwardly from the spout 120 of the water outlet 12.

Figure 4:
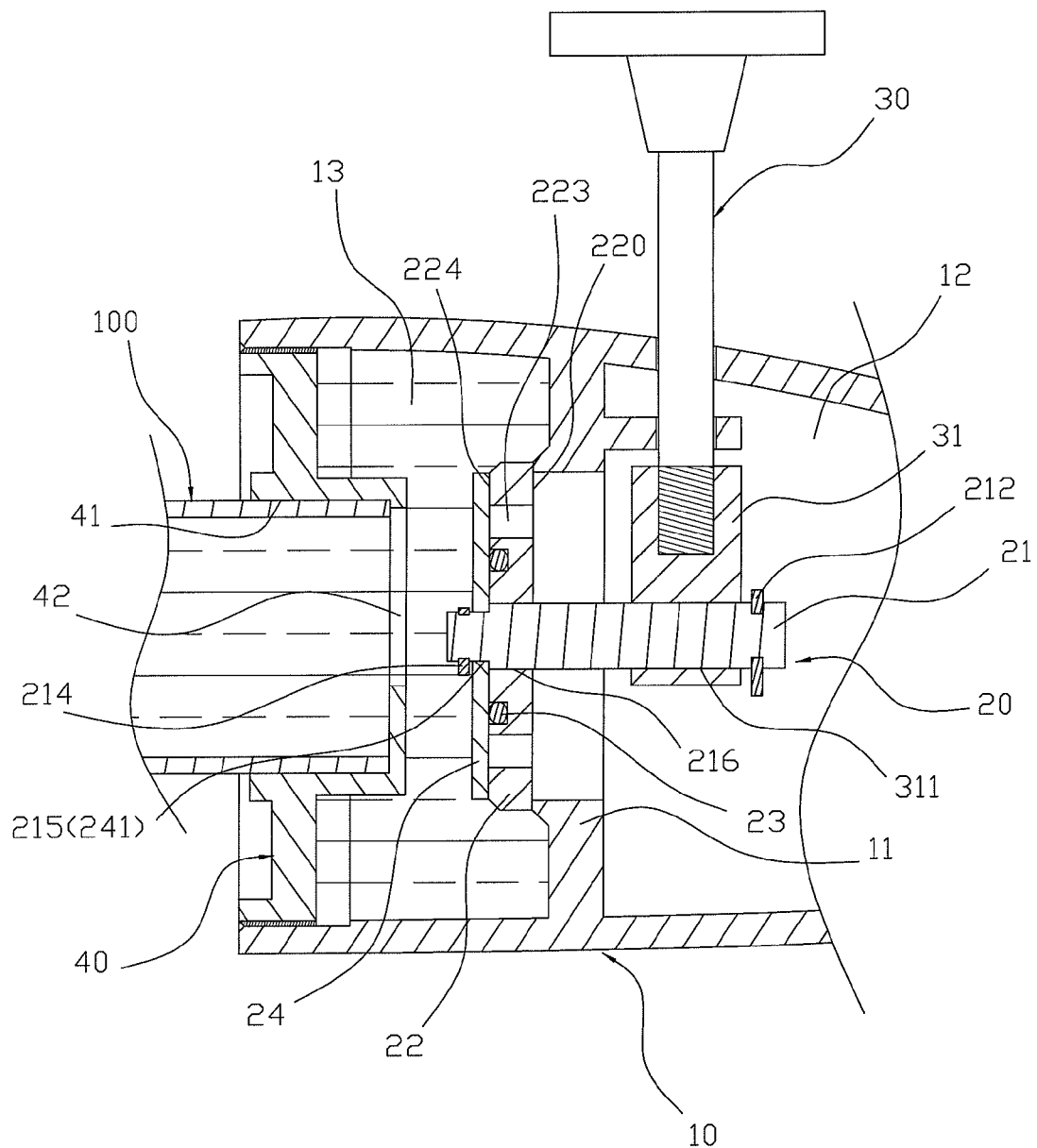
FIG. 4 is a schematic operational view of the faucet as shown in FIG. 3.

On the contrary, when the sealing plate 22 of the switching valve 20 is moved upward (by pulling the control knob 30 upward) to close and seal the switching port 11 of the faucet body 10 as shown in FIG. 4, the connection between the water inlet 13 and the water outlet 12 of the faucet body 10 is interrupted, so that the water from the water supply pipe 100 is stopped by the pressure release plate 24 and the sealing plate 22 of the switching valve 20 and is forced to flow into the shower head. At this time, the water pressure in the water inlet 13 of the faucet body 10 presses the pressure release plate 24 and the sealing plate 22 of the switching valve 20, so that the sealing plate 22 of the switching valve 20 presses the switching port 11 of the faucet body 10 closely, and the pressure release plate 24 of the switching valve 20 compresses the elastic member 23 of the switching valve 20 and presses the sealing plate 22 of the switching valve 20 closely to interrupt the connection between the water inlet 13 of the faucet body 10 and the connecting holes 223 of the sealing plate 22.

Figure 5:
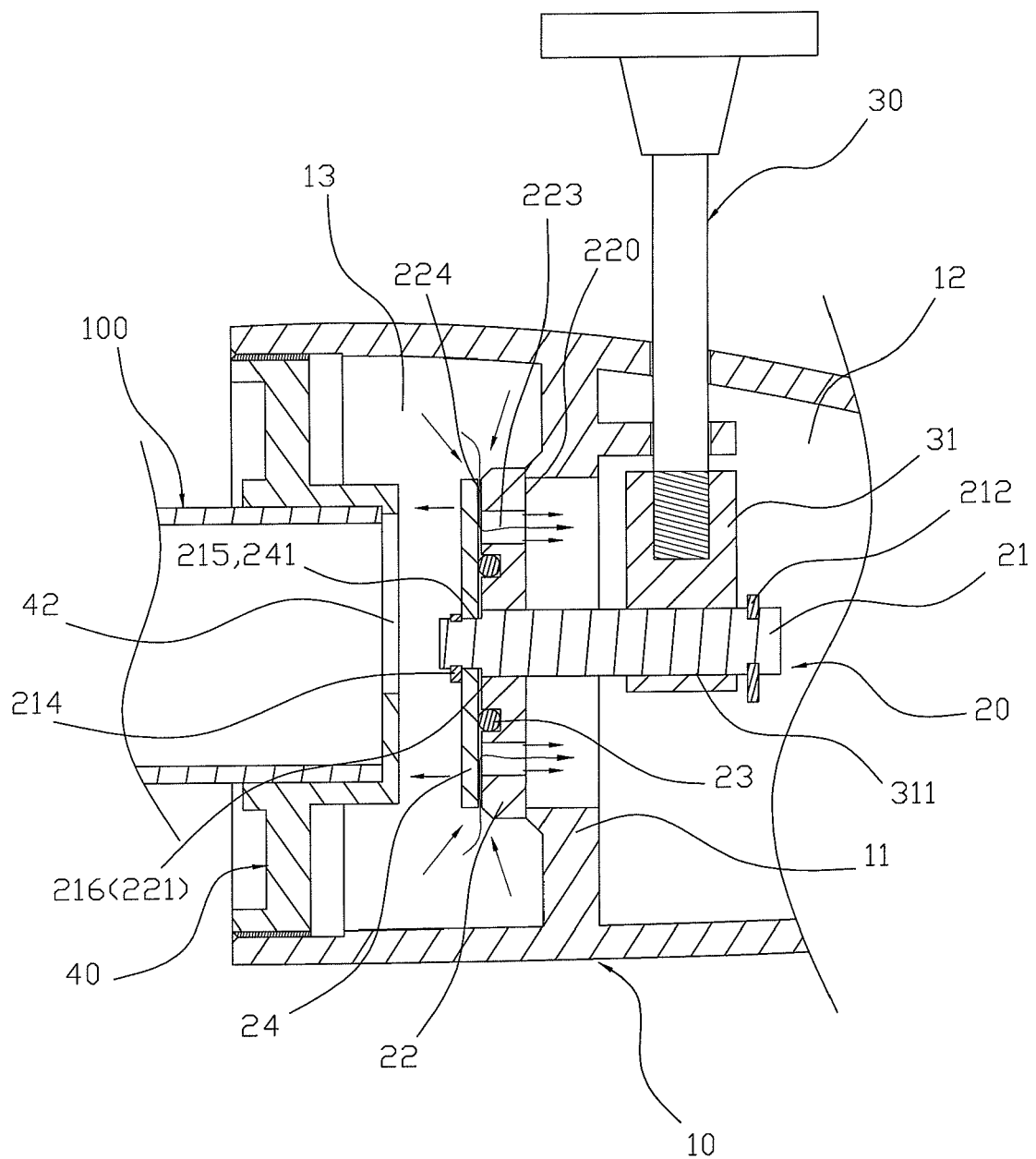
FIG. 5 is a schematic operational view of the faucet as shown in FIG. 4.

When the water from the water supply pipe 100 is stopped after usage, the water pressure in the water inlet 13 of the faucet body 10 is reduced largely, so that the pressure release plate 24 of the switching valve 20 is pushed by the restoring force of the elastic member 23 to detach from the sealing plate 22 of the switching valve 20 as shown in FIG. 5 so as to connect the connecting holes 223 of the sealing plate 22 to the water inlet 13 of the faucet body 10. Thus, the water in the water inlet 13 of the faucet body 10 is allowed to flow through the connecting holes 223 of the sealing plate 22 and the switching port 11 of the faucet body 10 into the water outlet 12 of the faucet body 10 to release the pressure in the water inlet 13 of the faucet body 10 completely.

Figure 6:
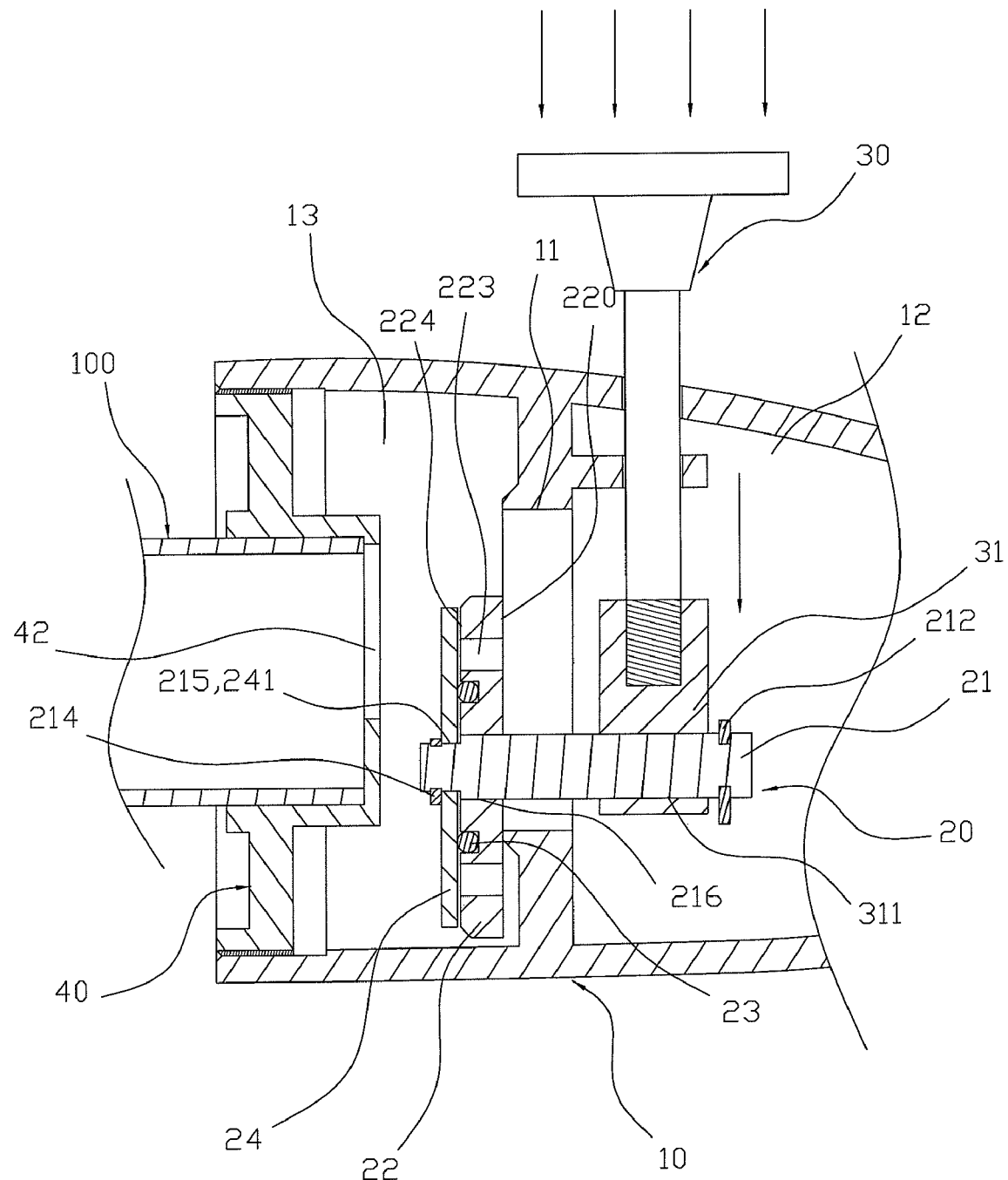
FIG. 6 is a schematic operational view of the faucet as shown in FIG. 5.
Figure 7:
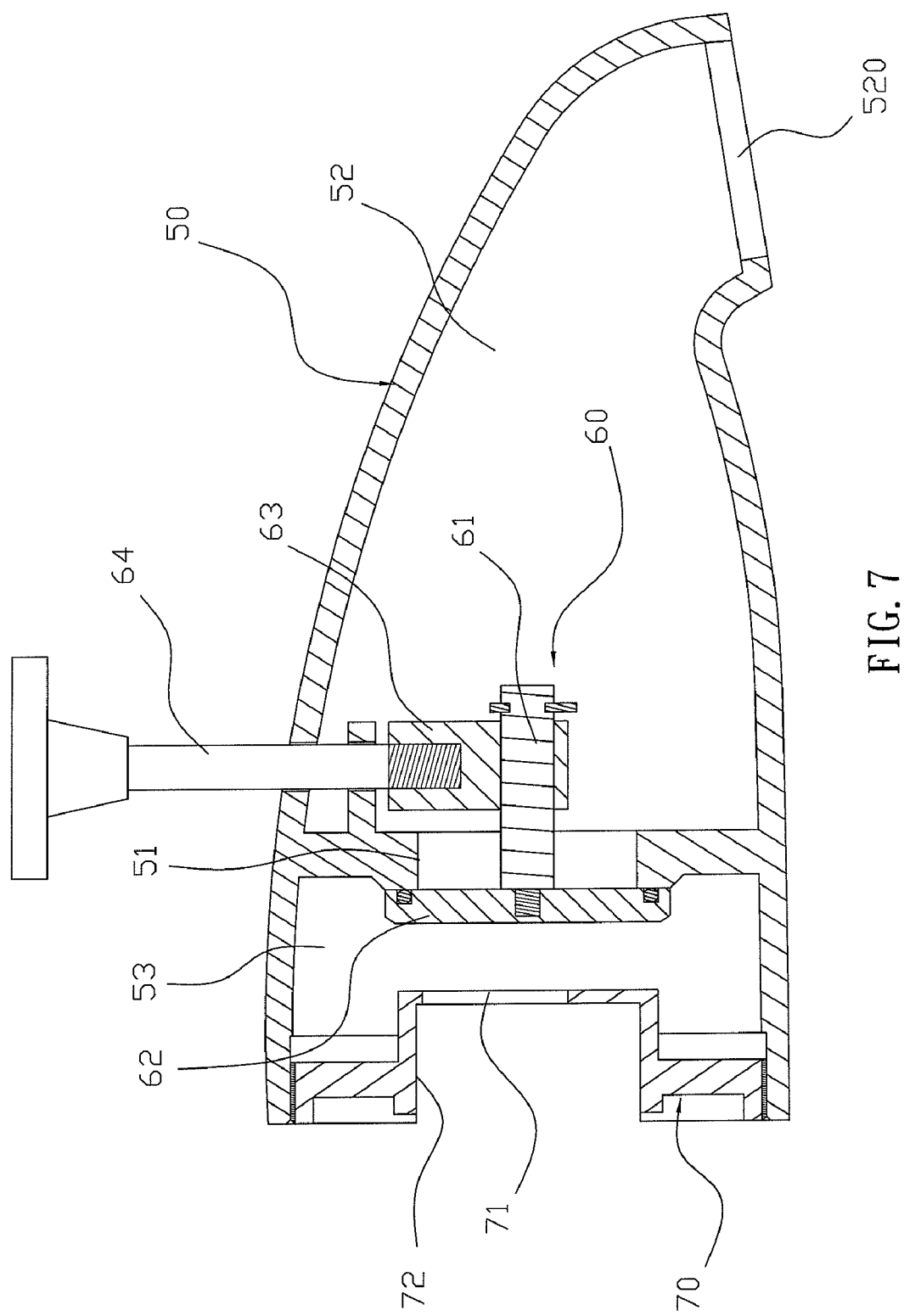
FIG. 7 is a side cross-sectional view of a conventional faucet in accordance with the prior art.

In such a manner, after the pressure in the water inlet 13 of the faucet body 10 is released completely, the pressure applied on the pressure release plate 24 and the sealing plate 22 of the switching valve 20 is removed, so that the switching valve 20 is moved downward by its gravity, and the sealing plate 22 of the switching valve 20 is moved downward to detach from the switching port 11 of the faucet body 10 as shown in FIG. 6 to connect the switching port 11 of the faucet body 10 to the water inlet 13 of the faucet body 10. Thus, the water inlet 13, the switching port 11 and the water outlet 12 of the faucet body 10 are connected at a normal state for the next usage of water to prevent the water from being introduced into the shower head at the next usage.

Accordingly, the switching valve 20 has a pressure release function to release the water pressure in the faucet body 10 automatically so that the sealing plate 22 of the switching valve 20 is moved downward by its gravity to detach from the switching port 11 of the faucet body 10, while the water inlet 13, the switching port 11 and the water outlet 12 of the faucet body 10 are connected at a normal state to allow entrance and passage of the water in the water supply pipe 100 so as to prevent the water from being introduced into the shower head at the next usage. In addition, the switching valve 20 is moved downward by its gravity to open the faucet body 10 automatically so that a user needs not to push the control knob 30 downward to switch the water outlet mode of the faucet, thereby facilitating the user switching and operating the faucet.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A faucet, comprising: a faucet body, a control knob, a follower and a switching valve, wherein:
   the faucet body has a first portion provided with a water inlet, a second portion provided with a water outlet and a mediate portion provided with a switching port connected between the water inlet and the water outlet;
   the control knob is movably mounted on the faucet body and has a lower end extending into the faucet body;
   the follower is movably mounted in the faucet body and secured on the lower end of the control knob to move in concert with the control knob;
   the switching valve is mounted in the faucet body and includes:
   a driven rod secured on the follower to move in concert with the follower;
   a sealing plate secured on the driven rod to move in concert with the driven rod and having a peripheral wall provided with a plurality of connecting holes connected between the water inlet and the switching port of the faucet body;
   a pressure release plate mounted on the driven rod and detachably pressing the sealing plate to interrupt a connection between the water inlet of the faucet body and the connecting holes of the sealing plate;
   an elastic member mounted between the sealing plate and the pressure release plate to push the pressure release plate to detach from the sealing plate and to connect the connecting holes of the sealing plate to the water inlet of the faucet body.

2. The faucet of claim 1, wherein the pressure release plate of the switching valve closes and seals the connecting holes of the sealing plate when the pressure release plate of the switching valve compresses the elastic member of the switching valve and abuts the sealing plate of the switching valve.

3. The faucet of claim 1, wherein the sealing plate of the switching valve is movable to close and seal the switching port of the faucet body so as to interrupt a connection between the water inlet and the water outlet of the faucet body.

4. The faucet of claim 1, wherein
   the sealing plate of the switching valve has a first side that is movable to close and seal the switching port of the faucet body;
   the sealing plate of the switching valve has a second side provided with a receiving groove to receive the elastic member.

5. The faucet of claim 4, wherein the elastic member of the switching valve partially protrudes outwardly from the second side of the sealing plate to separate the pressure release plate from the sealing plate at a normal state.

6. The faucet of claim 4, wherein the elastic member of the switching valve is retained in the receiving groove of the sealing plate.

7. The faucet of claim 4, wherein
   the receiving groove of the sealing plate has an annular shape;
   the elastic member of the switching valve has an annular shape.

8. The faucet of claim 4, wherein the receiving groove of the sealing plate faces the pressure release plate.

9. The faucet of claim 1, wherein
   the driven rod of the switching valve has a peripheral wall provided with a threaded portion and a guide portion located beside the threaded portion;
   the pressure release plate of the switching valve is movably mounted on the guide portion of the driven rod;
   the sealing plate of the switching valve has a central portion provided with a screw bore screwed onto the threaded portion of the driven rod to lock the sealing plate onto the driven rod.

10. The faucet of claim 9, wherein the pressure release plate of the switching valve has a central portion provided with a sliding hole movable on the guide portion of the driven rod.

11. The faucet of claim 9, wherein
   the driven rod of the switching valve has a first end protruding outwardly from the follower and provided with a first retaining groove to retain a first retaining member which limits the follower;
   the driven rod of the switching valve has a second end protruding outwardly from the pressure release plate and provided with a second retaining groove to retain a second retaining member which limits the pressure release plate.

12. The faucet of claim 11, wherein the guide portion of the driven rod is located between the threaded portion and the second retaining groove of the driven rod.

13. The faucet of claim 11, wherein the guide portion and the threaded portion of the driven rod are located between the first retaining groove and the second retaining groove of the driven rod.

14. The faucet of claim 11, wherein the guide portion of the driven rod has a diameter smaller than that of the threaded portion of the driven rod.

15. The faucet of claim 14, wherein the pressure release plate of the switching valve is limited between the threaded portion of the driven rod and the second retaining member.

* * * * *